(12) United States Patent
Lloyd

(10) Patent No.: US 7,185,902 B1
(45) Date of Patent: Mar. 6, 2007

(54) STRUT SUSPENSION WITH PIVOTING ROCKER ARM

(75) Inventor: Jeffrey Marshall Lloyd, Auburn Hills, MI (US)

(73) Assignee: Altair Engineering, Inc., Troy, MI (US)

( * ) Notice: Subject to any disclaimer, the term of this patent is extended or adjusted under 35 U.S.C. 154(b) by 422 days.

(21) Appl. No.: 10/797,446

(22) Filed: Mar. 10, 2004

Related U.S. Application Data

(60) Provisional application No. 60/454,829, filed on Mar. 14, 2003.

(51) Int. Cl.
*B60G 15/07* (2006.01)

(52) U.S. Cl. .................. 280/124.106; 280/86.752; 280/124.146; 280/124.15; 280/124.154

(58) Field of Classification Search ......... 280/124.106, 280/124.134, 124.135, 124.137–124.147, 280/124.15, 124.151, 124.152, 124.154, 280/124.155, FOR. 119, 86.751, 86.752; *B60G 15/07*
See application file for complete search history.

(56) References Cited

U.S. PATENT DOCUMENTS

| | | | |
|---|---|---|---|
| 2,621,919 A * | 12/1952 | Utz | 267/222 |
| 4,236,728 A | 12/1980 | Policy et al. | |
| 4,470,611 A * | 9/1984 | Duphily et al. | 280/104 |
| 4,632,413 A * | 12/1986 | Fujita et al. | 280/124.103 |
| 4,756,517 A | 7/1988 | Kakimoto | |
| 4,971,296 A | 11/1990 | Kondo | |
| 4,971,348 A | 11/1990 | Oyama et al. | |
| 4,981,287 A | 1/1991 | Cothenet | |
| 5,005,855 A | 4/1991 | Lee | |
| 5,048,859 A | 9/1991 | Nishikuma et al. | |
| 5,192,100 A | 3/1993 | Rumpel et al. | |
| 5,201,389 A | 4/1993 | Miller et al. | |
| 5,238,261 A * | 8/1993 | Ogiso | 280/124.138 |
| 5,292,149 A | 3/1994 | Luger | |
| 5,338,055 A | 8/1994 | Mauz | |
| 5,941,351 A | 8/1999 | Etnyre | |
| 6,032,752 A | 3/2000 | Karpik et al. | |
| 6,113,120 A * | 9/2000 | Heap | 280/124.135 |
| 6,155,543 A | 12/2000 | Solomond et al. | |
| 6,170,838 B1 | 1/2001 | Laurent et al. | |
| 6,237,706 B1 | 5/2001 | Karpik et al. | |
| 6,267,387 B1 | 7/2001 | Weiss | |
| 6,676,145 B2 * | 1/2004 | Carlstedt et al. | 280/124.146 |
| 6,719,313 B2 * | 4/2004 | Zadok | 280/124.106 |
| 2003/0122336 A1 * | 7/2003 | Zadok | 280/124.106 |

* cited by examiner

*Primary Examiner*—Ruth Ilan
(74) *Attorney, Agent, or Firm*—Young Basile

(57) ABSTRACT

A strut suspension can include a shock-absorber/spring assembly having a lower portion mountable at one end to an upper portion of the steering knuckle. A transverse link can be connectible to the steering knuckle at a location opposite from the shock-absorber/spring assembly. A rocker arm can be supportable for pivotal movement from the vehicle body and can be pivotally connectible to the shock-absorber/spring assembly from the steering knuckle. A push rod can be pivotally connectible to the rocker arm and can extend between the rocker arm and the transverse link. The upper end of the shock-absorber/spring assembly can be connected to either an inboard or outboard portion of the rocker arm, while an upper end of the push rod is connected to the other of the outboard or inboard portion of the rocker arm.

20 Claims, 4 Drawing Sheets

STRUT SUSPENSION WITH PIVOTING ROCKER ARM

CROSS-REFERENCE TO RELATED APPLICATIONS

This application claims the benefit of the Mar. 14, 2003 filing date of provisional patent application Ser. No. 60/454,829 which is incorporated by reference herein in its entirety.

FIELD OF THE INVENTION

The present invention relates to a strut suspension structure for an automotive vehicle to improve camber gain and roll center control, to provide variable caster control and progressive spring rates, while increasing shock piston velocities.

BACKGROUND OF THE INVENTION

The traditional McPherson strut is the most popular suspension on passenger cars today. However, the manufacturing and cost benefits of this setup result in reduced ride and handling performance. Various modifications have been proposed for strut suspension control systems, as evidenced by U.S. Pat. No. 6,267,387; U.S. Pat. No. 6,170,838; U.S. Pat. No. 5,292,149; U.S. Pat. No. 4,971,348; U.S. Pat. No. 4,756,517; and U.S. Pat. No. 4,236,728.

SUMMARY OF THE INVENTION

The improved strut suspension according to the present invention modifies the traditional McPherson strut suspension. The present invention improves camber gain and roll center control. The present invention provides variable caster control and progressive spring rates. The present invention also increases shock piston velocities. The improved strut suspension package according to the present invention can be bolted onto a performance or luxury version of a vehicle already equipped with a traditional strut suspension. The present invention draws the upper strut mount closer to the lower ball joint with respect to wheel movement.

The improved strut suspension according to the present invention includes a traditional strut architecture with the addition of an actuated upper strut mount or rocker arm, and a push rod. The push rod pivots the rocker arm to which the strut mount is attached. The pivoting of the rocker arm moves the upper strut mount both laterally and toward the lower ball joint. Both the pivot ratio and pivot locations can be optimized for improved handling (camber gain), improved ride characteristics (progressive strut displacement), or a balance in between. Rotating the rocker axis allows caster change and certain dive effects to be incorporated into the design. By actuating both ends of the strut, shock piston velocities are increased relative to wheel inputs allowing the damper to be more sensitive to the road profile. Strut displacement becomes mechanically progressive resulting in fewer natural modes. Also, the upper strut mount can be designed to move longitudinally to effect caster trail and other parameters improving ride. Lateral movement of the upper strut mount improves the camber curve and changes the side view swing arm resulting in increased lateral stability of the roll center. In the "normal load" condition, the upper strut mount is designed in the same location of mounting on a vehicle without the push rod and rocker assembly. Since the basic suspension geometry is unchanged, the additional cost of the assembly does not need to be incurred in all vehicle models. Instead, the improved suspension can be bolted onto either performance or luxury models of the vehicle, or as a factory installed option. With multiple vehicles based on the same platform, the suspension option can be selectively included, excluded, or modified for various vehicle derivatives to achieve modularity. The improved strut suspension according to the present invention provides improvement in ride control, better cornering, and performance enhancing bolt on modularity.

Other applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DESCRIPTION OF THE PREFERRED EMBODIMENT

Figure 1:
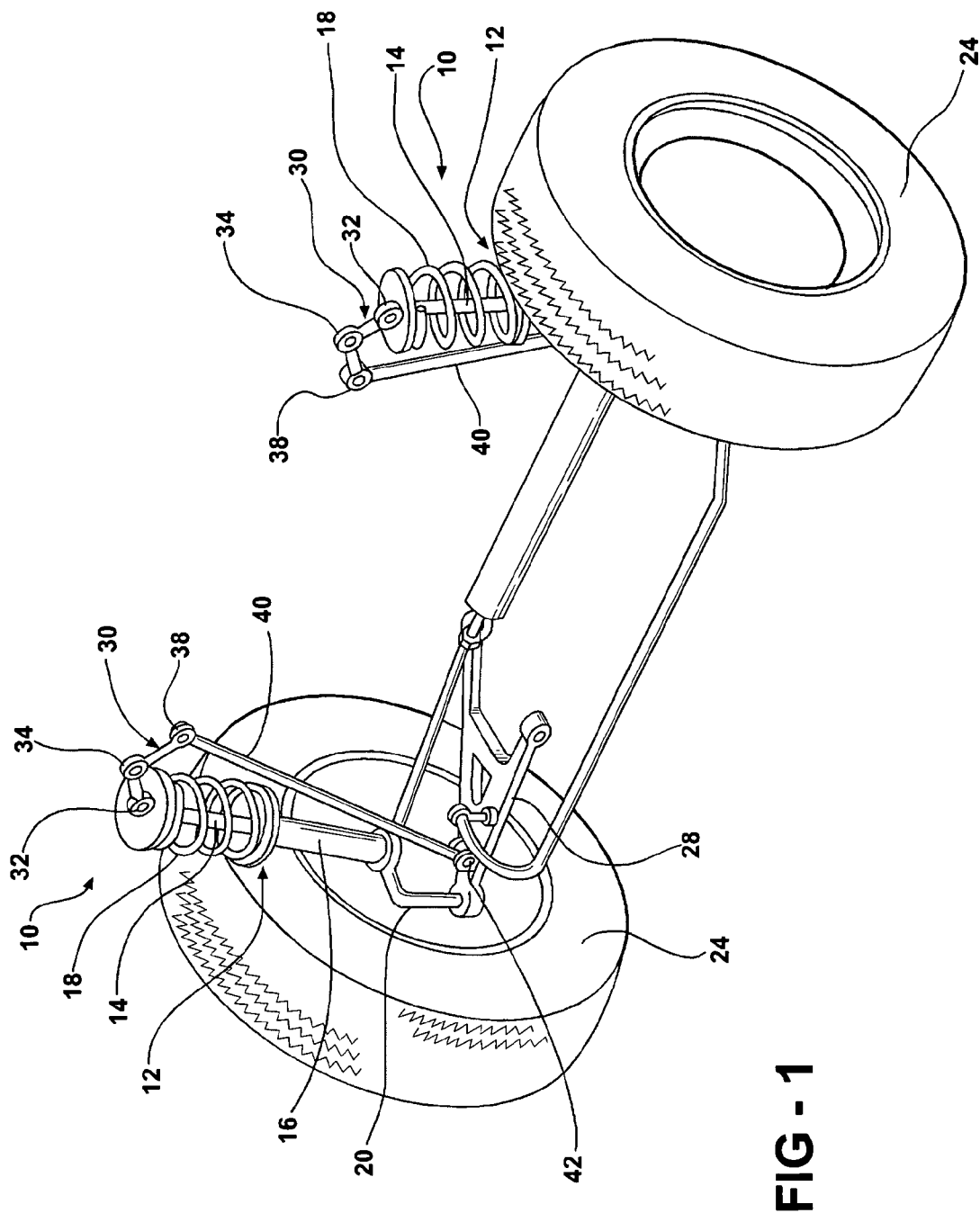
FIG. 1 is a simplified perspective view of an improved suspension strut according to the present invention.
Figure 2:
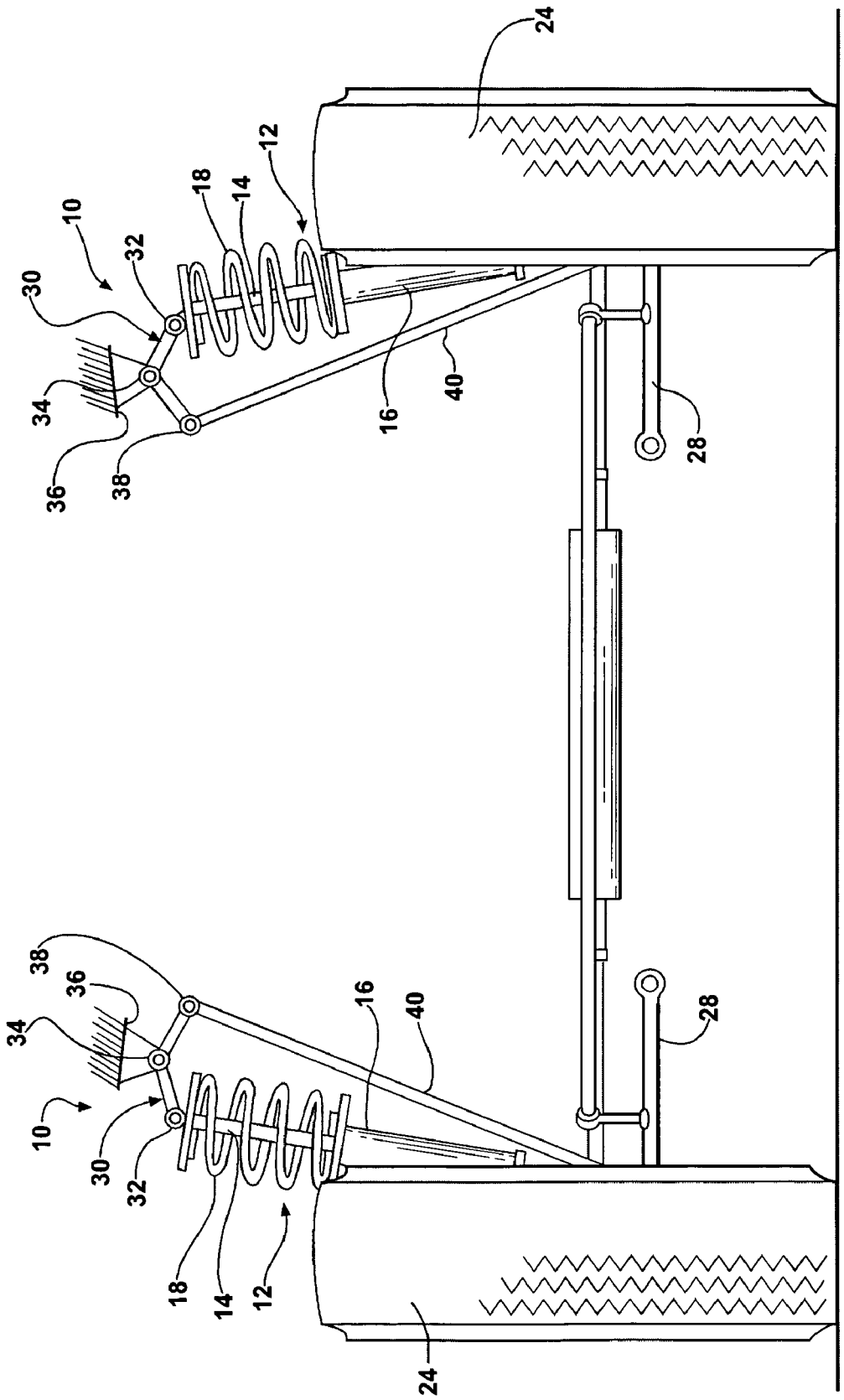
FIG. 2 is a front elevational view of the improved strut suspension according to the present invention.
Figure 4:
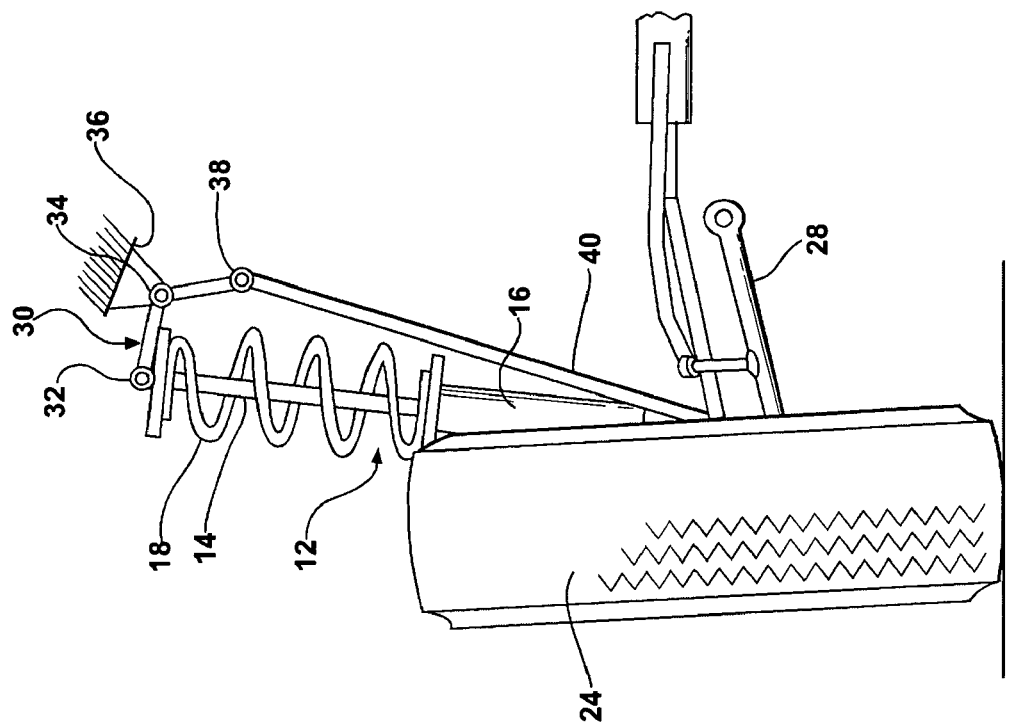
FIG. 4 is a front elevational view showing a "rebound" position of the improved suspension strut according to the present invention.

Referring now to FIGS. 1–5, an improved strut suspension 10 is illustrated. The strut suspension 10 includes a conventional shock absorber 12 including a reciprocal piston 14 within a cylinder 16 and spring 18 combination. The shock absorber assembly 12 is connected at a lower end to a steering knuckle 20. A wheel hub 22 is mounted on the steering knuckle 20 and rotatably supports the tire and rim assembly 24. The steering knuckle 20 also includes a lower ball joint 26 generally opposite from the connection of the lower end of the shock absorber assembly 12 to the steering knuckle 20. The lower ball joint 26 is connected to a transverse link 28.

The upper end of the shock absorber assembly 12 is connected to an upper strut mount or rocker arm 30. The upper portion of the shock absorber 12 is pivotally connected at 32 to one end of the rocker arm 30. The rocker arm 30 is pivotally supported at 34 to the automotive body or frame 36 shown in FIGS. 2–5. Opposite from the pivotal connection 32 on the rocker arm 30 is another pivotal connection 38. A push rod 40 is pivotally connected to the pivotal connection 38 of the rocker arm 30. The pivotal support 34 of the rocker arm 30 is generally positioned between the pivotal connection 32 and pivotal connection 38 of the rocker arm 30. The structural geometry of the rocker arm 30 can be modified as required for the particular application, as well as the orientation of the pivotal connections 32, 38 and pivotal support 34, as can be seen when comparing FIG. 1 with FIG. 5, where the rocker arm is shown with a slightly different structural geometry for the application illustrated in FIG. 5 from that illustrated in FIGS. 1–4. In both configurations, one end of the push rod 40 is connected to the pivotal connection 38 of the rocker arm 30, while an opposite end of the push rod 40 is pivotally connected to the transverse link 28 at pivotal connection 42.

The improved strut suspension according to the present invention provides improved camber gain and roll center control. The strut suspension according to the present invention provides variable caster control and progressive spring rates, while increasing shock piston velocities. The strut suspension according to the present invention can be provided in a package capable of being bolted onto a performance or luxury version of a vehicle already equipped with a traditional strut suspension. The strut suspension according to the present invention draws the upper strut mount closer to the lower ball joint with respect to wheel movement, providing more effective damping than a traditional strut suspension.

Figure 3:
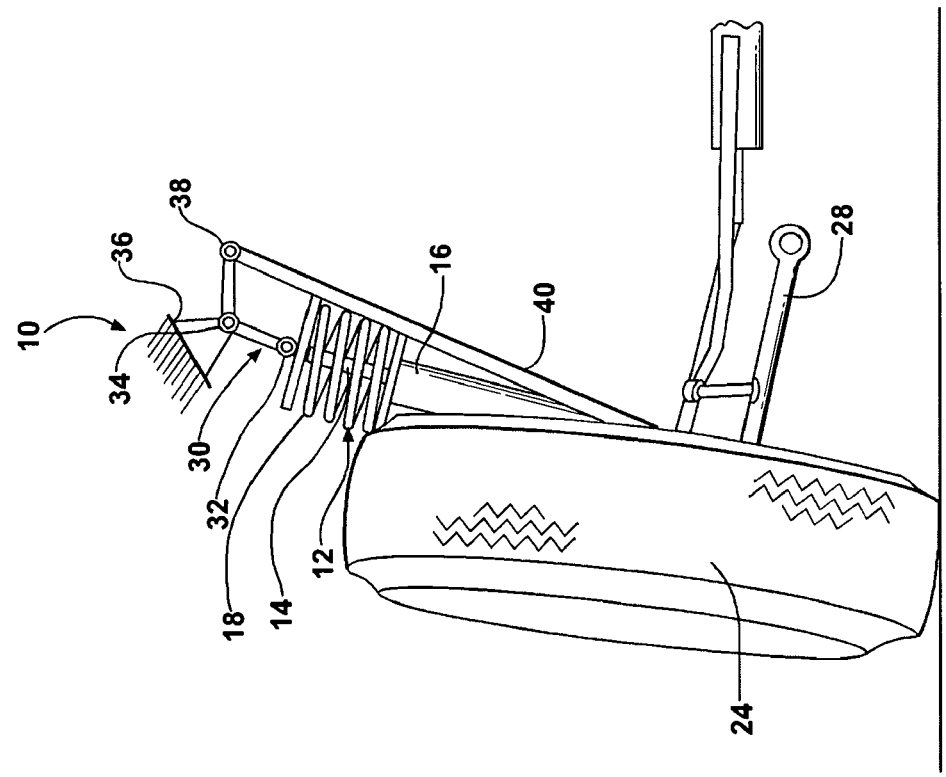
FIG. 3 is a front elevational view illustrating a "jounce" position of the improved suspension strut according to the present invention.
Figure 5:
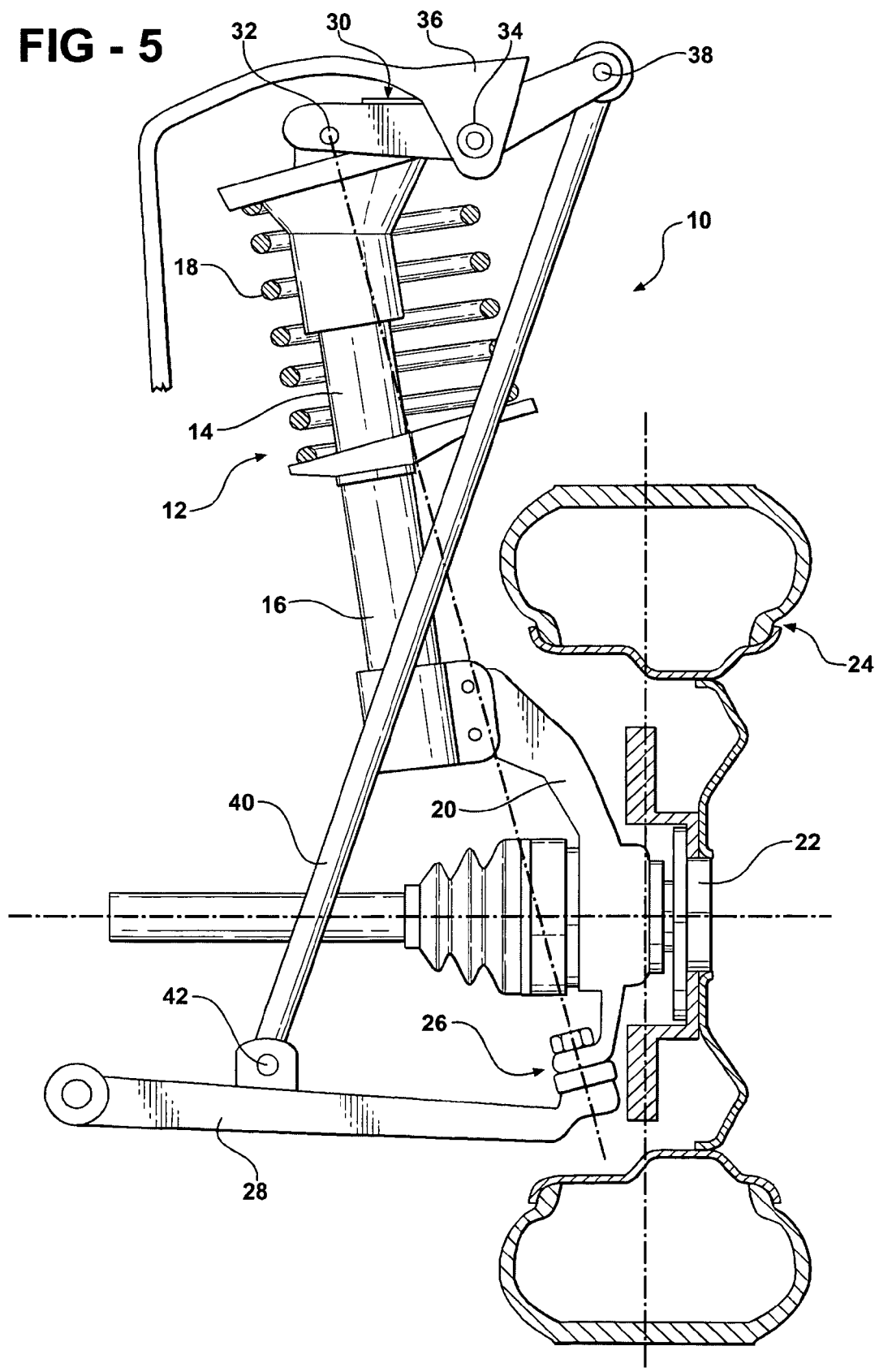
FIG. 5 is a rear elevational view of the improved strut suspension according to the present invention.

In operation, the push rod 40 pivots the rocker arm 30 through pivotal connections 38, 42. Pivoting movement of the push rod 40 moves the rocker arm 30 and pivotal connection 32 connected to the upper portion of the shock absorber 12 and spring 18. The rocker arm 30 pivots about the pivotal support 34 in response to movement of the push rod 40. The motion of the push rod 40 and connected rocker arm 30 moves the pivotal connection 32 both laterally and towards the lower ball joint as illustrated in FIG. 3. Both the pivot ratio and pivot locations can be optimized for improved handling (camber gain), improved ride characteristics (progressive strut displacement), or a balance in between camber gain and progressive strut displacement. Rotating the rocker arm about the axis of the pivotal support 34 allows caster change and certain drive effects to be incorporated into the design. By actuating both ends of the strut, shock piston velocities are increased relative to wheel inputs allowing the damper to be more sensitive to the road profile. Strut displacement becomes mechanically progressive resulting in fewer natural modes. The upper strut mount to pivotal connection 32 of the rocker arm 30 can be provided with a particular structural geometry to move longitudinally to effect caster trail and other parameters improving ride. Lateral movement of the pivotal connection 32 of the rocker arm 30 improves the camber curve and changes the side view swing arm resulting in increased lateral stability of the roll center. In the normal load condition illustrated in FIGS. 1 and 2, the pivotal connection 32 of the rocker arm 30 is configured to be in the same location as when mounted in a vehicle without the push rod and rocker assembly. The basic suspension geometry is unchanged, and the additional cost of the assembly does not need to be incurred in all vehicle models. Instead, the improved suspension according to the present invention can be bolted onto either performance or luxury models of the vehicle, or as a factory installed option. With multiple vehicles based on the same platform, the suspension option can be selectively included, excluded, or modified for various vehicle derivatives to provide the desired modularity.

An improved strut suspension including a shock absorber and spring assembly mounted at one end to a steering knuckle and a transverse link connected to the steering knuckle opposite from the shock absorber and spring mount location, the improvement including a rocker arm supported for pivotal movement from the vehicle body and pivotally connected to an opposite end of the shock absorber and spring assembly, while pivotally connecting a push rod between the rocker arm and the transverse link. In one configuration, the upper portion of the shock absorber is connected to an outboard portion of the rocker arm, while the upper portion of the push rod is connected to the inboard portion of the rocker arm with respect to the center line of the vehicle. The lower portion of the shock absorber 12 is connected to an upper portion of the steering knuckle, while the lower portion of the push rod is connected to a lower portion of the steering knuckle through the transverse link. In another embodiment, the upper portion of the shock absorber is connected to an inboard portion of the rocker arm, while an upper portion of the push rod is connected to an outboard portion of the rocker arm with respect to the center line of the vehicle. The lower portion of the shock absorber is connected to the upper portion of the steering knuckle, while the lower portion of the push rod is connected to the lower portion of the steering knuckle through the transverse link.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. An improved strut suspension for a vehicle body, the suspension including a shock absorber and spring assembly mounted at one end to a steering knuckle, and a transverse link connected to the steering knuckle opposite from the shock absorber and spring mount location, the improvement comprising:
    a rocker arm having a first pivot point supportable for pivotal movement from the vehicle body, a first portion of the rocker arm having a second pivot point connectible directly to an end of the shock absorber and spring assembly opposite from the steering knuckle, and a second portion of the rocker arm having a third pivot point connectible directly to a push rod, the push rod connectible between the rocker arm and the transverse link, the three pivot points defining one inboard pivot point, one outboard pivot point, and one fixed pivot point located between the inboard and outboard pivot points with respect to a centerline of the vehicle body.

2. The improved strut suspension of claim 1 further comprising:
    an upper portion of the shock absorber connectible to an outboard portion of the rocker arm, and an upper portion of the push rod connectible to an inboard portion of the rocker arm with respect to a centerline of the vehicle body.

3. The improved strut suspension of claim 2 further comprising:
    a lower portion of the shock absorber connectible to an upper portion of the steering knuckle, and a lower portion of the push rod connectible to a lower portion of the steering knuckle through the transverse link.

4. The improved strut suspension of claim 1 further comprising:
    an upper portion of the shock absorber connectible to an inboard portion of the rocker arm, and an upper portion of the push rod connectible to an outboard portion of the rocker arm with respect to a centerline of the vehicle body.

5. The improved strut suspension of claim 4 further comprising:
    a lower portion of the shock absorber connectible to an upper portion of the steering knuckle, and a lower portion of the push rod connectible to a lower portion of the steering knuckle through the transverse link.

6. The improved strut suspension of claim 1 further comprising:
    a lower portion of the shock absorber connectible to an upper portion of the steering knuckle, and a lower portion of the push rod connectible to a lower portion of the steering knuckle through the transverse link.

7. A strut suspension for a vehicle body having a steering knuckle comprising:
a shock absorber and spring assembly mountable at one end to the steering knuckle;
a transverse link connectible to the steering knuckle at a location opposite from the shock absorber and spring mount;
a rocker arm having a first pivot point located laterally with respect to a centerline of the vehicle body between second and third pivot points, the first pivot point of the rocker arm supportable for pivotal movement from the vehicle body, a first portion of the rocker arm pivotally connectible at the second pivot point directly to an end of the shock absorber and spring assembly opposite from the steering knuckle, and a second portion of the rocker arm pivotally connectible at the third pivot point; and
a push rod pivotally connectible at the third pivot point directly to the rocker arm, the push rod extending between the rocker arm and the transverse link.

8. The strut suspension of claim 7 further comprising:
an upper portion of the shock absorber connected to an outboard portion of the rocker arm, and an upper portion of the push rod connected to an inboard portion of the rocker arm with respect to a centerline of the vehicle body.

9. The strut suspension of claim 8 further comprising:
a lower portion of the shock absorber connectible to an upper portion of the steering knuckle, and a lower portion of the push rod connectible to a lower portion of the steering knuckle through the transverse link.

10. The strut suspension of claim 7 further comprising:
an upper portion of the shock absorber connected to an inboard portion of the rocker arm, and an upper portion of the push rod connected to an outboard portion of the rocker arm with respect to a centerline of the vehicle body.

11. The strut suspension of claim 10 further comprising:
a lower portion of the shock absorber connectible to an upper portion of the steering knuckle, and a lower portion of the push rod connectible to a lower portion of the steering knuckle through the transverse link.

12. The strut suspension of claim 7 further comprising:
a lower portion of the shock absorber connectible to an upper portion of the steering knuckle, and a lower portion of the push rod connectible to a lower portion of the steering knuckle through the transverse link.

13. A strut suspension for a vehicle body having a steering knuckle comprising:
a shock absorber and spring assembly mountable at one end to the steering knuckle;
a transverse link connected to the steering knuckle opposite from the shock absorber and spring mount location; and
a rocker arm mountable for pivotal movement about a central portion from the vehicle body, a first outer end portion of the rocker arm pivotally connected directly to an end of the shock absorber and spring assembly, and a second outer end portion of the rocker arm opposite from the first outer portion pivotally connected to the transverse link.

14. The strut suspension of claim 13 wherein the second outer end portion connected to the transverse link further comprises:
a push rod connected to the transverse link at one end and pivotally connected directly to the second outer end portion of the rocker arm at an opposite end.

15. The strut suspension of claim 14 further comprising:
an upper portion of the shock absorber connectible to an outboard portion of the rocker arm, and an upper portion of the push rod connectible to an inboard portion of the rocker arm with respect to a centerline of the vehicle body.

16. The strut suspension of claim 15 further comprising:
a lower portion of the shock absorber connectible to an upper portion of the steering knuckle, and a lower portion of the push rod connectible to a lower portion of the steering knuckle through the transverse link.

17. The strut suspension of claim 14 further comprising:
an upper portion of the shock absorber connectible to an inboard portion of the rocker arm, and an upper portion of the push rod connectible to an outboard portion of the rocker arm with respect to a centerline of the vehicle body.

18. The strut suspension of claim 17 further comprising:
a lower portion of the shock absorber connectible to an upper portion of the steering knuckle, and a lower portion of the push rod connectible to a lower portion of the steering knuckle through the transverse link.

19. The strut suspension of claim 14 further comprising:
a lower portion of the shock absorber connectible to an upper portion of the steering knuckle, and a lower portion of the push rod connectible to a lower portion of the steering knuckle through the transverse link.

20. A strut suspension for a vehicle body having a steering knuckle comprising:
a shock absorber and spring assembly having a lower portion mountable at one end to an upper portion of the steering knuckle;
a transverse link connectible to the steering knuckle at a location opposite from the shock absorber and spring mount;
a rocker arm supportable at a first pivot point for pivotal movement with respect to the vehicle body, a first portion of the rocker arm pivotally connectible at a second pivot point directly to an end of the shock absorber and spring assembly opposite from the steering knuckle, and a second portion of the rocker arm having a third pivot point, the first pivot point located laterally with respect to a centerline of the vehicle body between the second and third pivot points; and
a push rod pivotally connectible directly to the third pivot point for pivotal movement with respect to the rocker arm, the push rod extending between the rocker arm and the transverse link, and a lower portion of the push rod connectible to a lower portion of the steering knuckle through the transverse link, wherein the strut suspension is configurable in at least one of two configurations, a first configuration where an upper portion of the shock absorber is connected to an outboard portion of the rocker arm, and an upper portion of the push rod is connected to an inboard portion of the rocker arm with respect to a centerline of the vehicle body, and a second configuration where an upper portion of the shock absorber is connected to an inboard portion of the rocker arm, and an upper portion of the push rod is connected to an outboard portion of the rocker arm with respect to a centerline of the vehicle body.

* * * * *